March 18, 1958 G. M. BIANCHINI 2,826,965
SLOTTING TOOL
Filed Feb. 28, 1956 2 Sheets-Sheet 1

INVENTOR.
GEORGE M. BIANCHINI
BY Arthur H. Seidel
ATTORNEY

March 18, 1958 G. M. BIANCHINI 2,826,965
SLOTTING TOOL
Filed Feb. 28, 1956 2 Sheets-Sheet 2

INVENTOR.
GEORGE M. BIANCHINI
BY Arthur H. Seidel
ATTORNEY

United States Patent Office 2,826,965
Patented Mar. 18, 1958

2,826,965
SLOTTING TOOL

George M. Bianchini, Philadelphia, Pa., assignor to David Diperstein, Philadelphia, Pa.

Application February 28, 1956, Serial No. 568,367

12 Claims. (Cl. 90—38)

The present invention relates to a slotting tool, and more particularly to a slotting tool which may be used to make precision cuts in metal within relatively small working areas.

There has long been a need for a small portable slotting tool or saw capable of making accurate cuts in metal. For example, in the lock fastening methods for repairing cracked and fractured castings, such as motor blocks, it is frequently necessary to cut away a precise lock pattern in order to enable the lock fasteners to be inserted in position to effectively seal the crack. Thus, in the repair of an automotive motor block having a crack between the exhaust valve port and cylinder, difficulty has been experienced with prior saws and drills in effecting the precise cuts necessary to insure water-tight and pressure-tight repairs.

This invention has as an object the provision of a slotting tool or saw capable of making precise cuts in metal along predetermined paths.

This invention has as a further object the provision of a small portable slotting tool or saw which may be carried about by a single individual from place to place, and which may be anchored directly to the workpiece.

This invention has as yet another object the provision of a slotting tool whose cutting action may be adjusted radially, horizontally, and vertically when the tool is disposed in an upright position.

Other objects will appear hereinafter.

For the purpose of illustrating the invention there is shown in the drawings a form which is presently preferred; it being understood, however, that this invention is not limited to the precise arrangements and instrumentalities shown.

Referring to the drawings wherein like reference characters refer to like parts:

Figure 1:
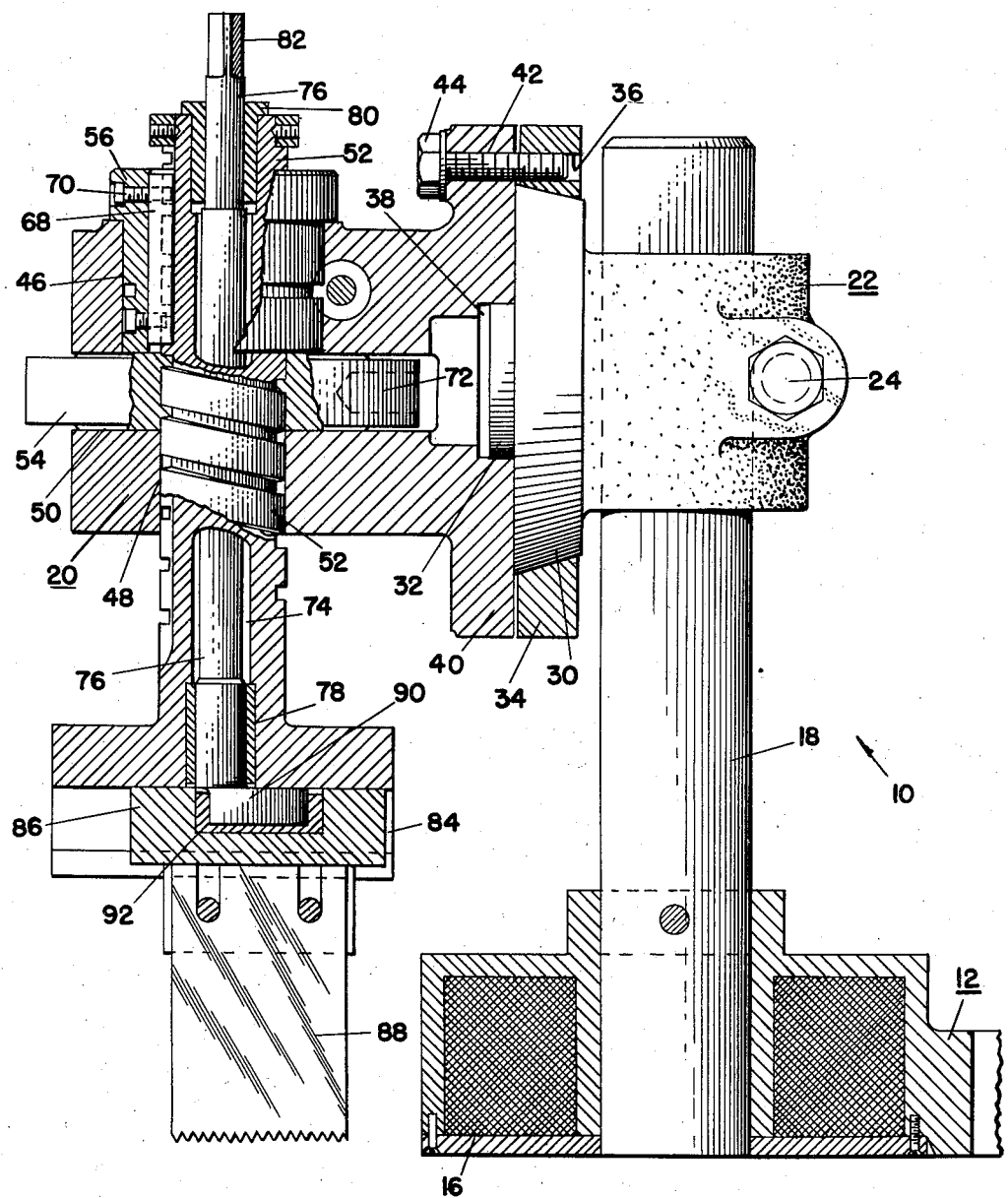
Figure 1 is a vertical sectional view through the slotting tool of the present invention.
Figures 2, 3:
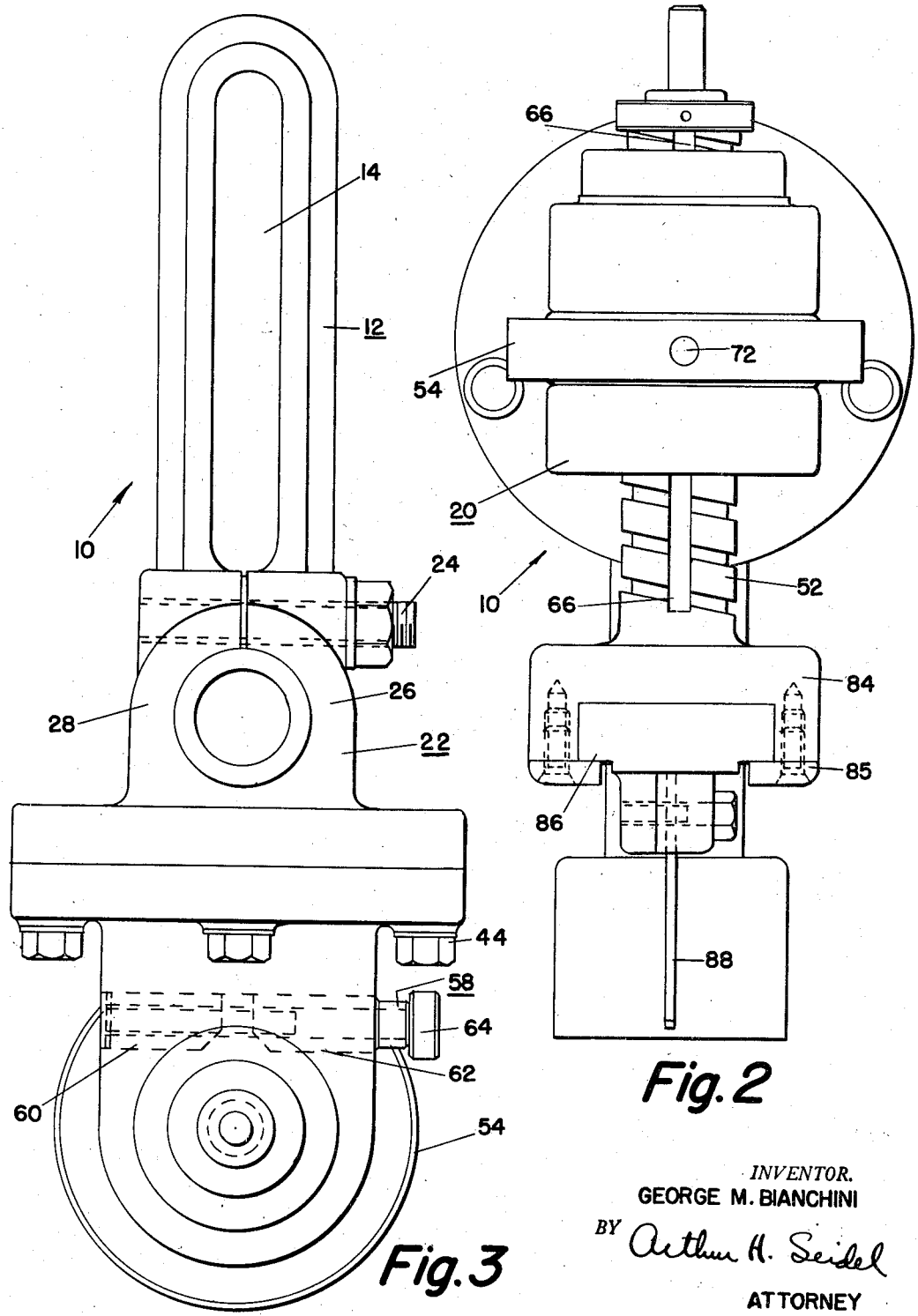
Figure 2 is an elevational view of the slotting tool of the present invention.
Figure 3 is a plan view of the slotting tool of the present invention.

The slotting tool or saw of the present invention is designated generally by the numeral 10 and includes a base or foot designated by the numeral 12. Base 12 is provided with an elongated slot 14 which permits the slotting tool 10 to be operatively clamped as by means of bolts to the motor block or other casting on which repairs are being effected.

Base 12 is also provided with a powerful electromagnetic chuck diagrammatically designated 16 which enables the tool 10 to be magnetically secured to ferrous metal workpieces. The constructional details of the magnetic chuck 16 form no part of the present invention, and any one of a wide variety of suitable so-called magnetic chucks may be used herein.

An upright cylindrical post or shaft 18 projects upwardly from base 12 and is rigidly and non-rotatably secured thereto. Shaft 18 should be of sufficient width and strength to carry the weight of tool 10 without buckling or distortion.

The housing portion of tool 10 is designated generally by the numeral 20 and is carried on upright shaft 18 by means of bracket 22. Bracket 22 comprises a split member which embraces shaft 18, and which may be raised or lowered along the height of shaft 18. After being raised or lowered, the bracket 22 may be locked at a predetermined height on shaft 18 by tightening nut 23 carried on screw 24, which draws the lips or arms 26 and 28 formed by the split in bracket 22 together, so that the lips 26 and 28 frictionally engage the outer surface of shaft 18.

Bracket 22 is provided with a frustoconical pivot bearing member 30 and a cylindrical nub 32.

A ring 34 whose internal opening is tapered to mate with the contour of frustoconical pivot bearing member 30 is carried about bearing member 30. Ring 34 is provided with a plurality of threaded openings 36 in its peripheral portion.

Housing 20 is provided with a bored end 38 which embraces nub 32. The portion of housing 20 proximate bored end 38 comprises an annular flange 40 containing a plurality of non-threaded openings 42 through which threaded bolts 44 may be inserted. Threaded bolts 44 are threadably received within threaded openings 36 in ring 34. Upon the tightening of threaded bolts 44 the ring 34 is urged against frustoconical pivot bearing member 30 locking the housing 20 in position. The loosening of bolts 44 releases ring 34 from pivot bearing member 30 permitting the housing 20 to be rotated about pivot bearing member 30.

A scale may be provided on flange 40 to measure the extent of rotation of housing 20 in respect to shaft 18.

Housing 20 is provided with a relatively large circular opening 46, and a relatively small opening 48 therebeneath, with an opening 50 for receiving turnwheel 54 positioned therebetween.

A vertically disposed threaded shaft 52 extends through openings 46, 50 and 48 and is threadably engaged with turnwheel 54 which is rotatably positioned in opening 50.

A bushing 56 is carried in opening 46. The bushing 56 may be non-rotatably secured within opening 46 by means of frictional lock 58 comprising a pair of friction blocks 60 and 62, which may be urged together and against bushing 56 by the rotation of screw 64, thereby locking bushing 56 in position.

The threads on threaded shaft 52 are slotted axially to provide a keyway 66 for key 68 which is vertically carried by bolts 70 disposed in the wall of bushing 56.

Turnwheel 54 is provided along its periphery with a plurality of evenly spaced sockets 72 constructed and arranged to receive a lever-type tool so as to permit rotation of turnwheel 54. A graduated index or other marking means may be provided on turnwheel 54 with indicating means provided on housing 20 for ascertaining the vertical movement of threaded shaft 52.

Threaded shaft 52 is provided with a vertically extended bore 74 within which is received the shaft 76. A bearing sleeve 78 may be provided at the lower end of bore 74 and a bushing bearing 80 may be provided at the upper end of bore 74 to guide shaft 76.

The upper end of shaft 76 is preferably provided with triangularly disposed flats 82 to facilitate the gripping of shaft 76 by a three jaw chuck or the like of a motor or other means for rotating shaft 76.

The lower end of threaded shaft 52 is expanded horizontally and forms a guide 84 having dependent inwardly extending flanges 85, within which the T-shaped slide 86, which carries the saw blade 88, is received. The reciprocal movement of slide 86 within guide 84 resulting in the cutting stroke movements of saw blade 88 is effected by means of the eccentric 90 which is carried by the lowermost end of shaft 76 within liner 92.

The operation of the tool 10 of the present invention is as follows:

The tool 10 is positioned in operative disposition in respect to the workpiece. This may be accomplished by the use of magnetic chuck 16, or by passing bolts through elongated slot 14 to be threadably received within mating openings in the workpiece. For example, in the slotting of a motor block to effect repairs in a crack occurring between the exhaust valve port and the cylinder of the block, the foot 12 may be anchored in position by extending bolts through elongated slot 14 into the threaded openings in the upper face of the motor block, which normally are used to anchor the head of the block. The housing 20 may be pivoted about shaft 18 by loosening nut 23 carried on screw 24 permitting the lips 26 and 28 of bracket 22 to release shaft 18, whereby rotation of the housing 20 about the shaft 18 may be effected.

The tightening of threaded bolt 24 locks housing 20 at the desired height on shaft 18.

The pivotation of housing 20 in respect to the vertical may be effected by loosening threaded bolts 44 and pivoting ring 34 about frustroconical pivot bearing member 30. The housing 20 may be locked in the desired angular disposition by tightening threaded bolts 44. Thus, the housing 20 may be pivoted in a vertical plane and in a horizintal plane, and may be raised or lowered in respect to the horizontal.

The rotation of the saw blade 88 in a horizontal plane, as when the saw blade 88 is positioned above the workpiece, may be accomplished by loosening screw 64 and releasing friction blocks 60 and 62 from engagement with the outer surface of bushing 56. It is therefore possible with the tool of the present invention to adjust not only the angle of approach in respect to the vertical, but also the angle of cut in respect to the horizontal.

The vertical feeding of the saw blade 88 into and out of the cut, and the close regulation of its vertical displacement may be accomplished by the rotation of turnwheel 54. This is preferably effected by inserting a pick or other lever member into sockets 72. The rotation of turnwheel 54 causes the raising or lowering of threaded shaft 52.

The rapid rotation of shaft 76 is translated into the reciprocal movement of saw blade 88 by the movement of eccentric 90 secured to the lowermost end of shaft 76.

The rate of speed of cut, saw tooth configuration, and other operating variables, may be varied to suit the specific materials which are being handled.

The present invention may be embodied in other specific forms without departing from the spirit or essential attributes thereof and, accordingly, reference should be made to the appended claims, rather than to the foregoing specification as indicating the scope of the invention.

I claim:

1. A slotting tool including securement means for fastening the tool to a workpiece, a projection from said securement means, support means carried on said projection, said support means being movable on said projection, means for locking said support means at a desired height, a holder carried on said support means, and a cutting edge carried by said holder, means for raising and lowering said holder in respect to said support means, means for locking said holder in respect to said support means at a desired height, means for rotating said holder in respect to said support means, means for selectively locking said holder at a predetermined rotated disposition in respect to said support means, means for rotating said support means in respect to said projection and means for selectively locking said support means at a predetermined rotated disposition in respect to said projection.

2. A portable slotting tool including securement means for fastening the tool to a workpiece, said securement means including an electromagnetic chuck, and an elongated foot through which bolting members for holding the slotting tool in operative disposition may be passed, a projection from said securement means, support means carried on said projection, said support means being movable on said projection, means for locking said support means at a desired height, a holder carried on said support means, and a reciprocally movable saw tooth cutting edge which traverses a rectilinear path carried by said holder, means for raising and lowering said holder in respect to said support means, means for locking said holder in respect to said support means at a desired height, means for rotating said holder in respect to said support means, means for selectively locking said holder at a predetermined rotated disposition in respect to said support means, means for rotating said support means in respect to said projection and means for selectively locking said support means at a predetermined rotated disposition in respect to said projection.

3. A slotting tool including a base, means for securing said base to a workpiece, an upright extending from said base, a bracket, means for selectively securing said bracket at a predetermined height on said upright, a holder carried by said bracket, threaded means on said holder engaged with threaded means carried by said bracket for raising and lowering said holder, a saw tooth cutting edge carried by said holder, a rotatable shaft extending through said holder, a cam engaged with said shaft and said cutting edge for reciprocating said cutting edge in a rectilinear path, means for planarly rotating said holder in respect to said bracket, and means carried by said bracket and engaged with said holder for rotating said holder in respect to said bracket in a plane normal to said last-mentioned plane of rotation.

4. A slotting tool including securement means for fastening the tool to a workpiece, a projection from said securement means, support means carried on said projection, a holder carried on said support means, a reciprocating cutting edge carried by said holder, means for reciprocating said cutting edge, means for raising and lowering said holder in respect to said support means, means for rotating said holder and said reciprocating cutting edge in respect to said support means in a predetermined path, means for locking said holder in a predetermined position within said last-mentioned path, means for rotating said support means in respect to said projection in a predetermined path, and means for locking said support means in a predetermined position within said last-mentioned path.

5. A portable slotting tool in accordance with claim 4 in which the securement means comprises an electromagnetic chuck.

6. A portable slotting tool in accordance with claim 4 in which the securement means comprises an elongated foot through which bolting members for holding the slotting tool in operative disposition may be passed.

7. A portable slotting tool in accordance with claim 4 in which the securement means comprises an elongated foot having a slot through which bolting members for holding the slotting tool in operative disposition may be passed and which includes an electromagnetic chuck.

8. A slotting tool including securement means for fastening the tool to a workpiece, a projection from said securement means, support means carried on said projection, said support means being movable on said projection, a holder carried on said support means, a reciprocating cutting edge carried by said holder, means for reciprocating said cutting edge, means for raising and lowering said holder in respect to said support means, means for rotating said holder and said reciprocating cutting edge in respect to said support means in a predetermined path, means for locking said holder in a predetermined position within said last-mentioned path, means for rotating said support means in respect to said projection in a predetermined path, and means for locking said support means in a predetermined position within said last-mentioned path.

9. A slotting tool including a cutting edge, a holder for said cutting edge, means extending through said holder for reciprocating said cutting edge in a rectilinear path, threaded means for raising and lowering said holder, means for planarly rotating said holder and said cutting edge in a predetermined path, means for locking said holder in a predetermined position within said last-mentioned path, means for rotating said holder in a plane normal to said last-mentioned plane of rotation, means for locking said holder in a predetermined position within said normal plane, and securement means for fastening said tool to a workpiece.

10. A portable slotting tool in accordance with claim 9 in which the securement means constitutes a magnetic chuck.

11. A portable slotting tool in accordance with claim 9 in which the securement means constitutes an elongated foot having a slot through which bolting members for holding the slotting tool in position may be passed.

12. A portable slotting tool in accordance with claim 9 in which the securement means constitutes an elongated foot having a slot through which bolting members for holding the slotting tool in position may be passed and includes a magnetic chuck.

References Cited in the file of this patent
UNITED STATES PATENTS

| | | |
|---|---|---|
| 599,914 | Nitschmann | Mar. 1, 1898 |
| 1,974,097 | Beard | Sept. 18, 1934 |
| 2,065,486 | Albertson | Dec. 22, 1936 |
| 2,607,107 | Saucke | Aug. 19, 1952 |
| 2,672,770 | Buck | Mar. 23, 1954 |